United States Patent [19]

Ludwig

[11] 3,953,038
[45] Apr. 27, 1976

[54] FLUID SEAL FOR ROTATING SHAFTS

[75] Inventor: Lawrence P. Ludwig, Fairview Park, Ohio

[73] Assignee: The United States of America as represented by the United States National Aeronautics and Space Administration, Washington, D.C.

[22] Filed: Feb. 19, 1975

[21] Appl. No.: 551,184

[52] U.S. Cl. .............................. 277/93 R; 277/4; 277/41; 277/74
[51] Int. Cl.$^2$ ........................................ F16J 15/34
[58] Field of Search ............... 277/4, 81 R, 41, 93 R, 277/74

[56] References Cited
UNITED STATES PATENTS

| | | | |
|---|---|---|---|
| 1,826,212 | 10/1931 | Gremminger | 277/74 X |
| 2,575,549 | 11/1951 | Doble | 277/93 |
| 2,706,652 | 4/1955 | Berger | 277/41 |
| 2,756,080 | 7/1956 | Andresen et al. | 277/4 X |

*Primary Examiner*—Samuel B. Rothberg
*Attorney, Agent, or Firm*—N. T. Musial; G. E. Shook; J. R. Manning

[57] ABSTRACT

An improved fluid seal for a rotating shaft is provided which includes an inner annular ring or runner adapted to be secured to the rotating shaft and a composite sealing ring which is keyed to the inner ring and includes a radial sealing surface. An outer, nonrotating, annular ring or housing which is concentrically disposed with respect to the runner and sealing ring, includes a radial sealing surface which sealingly engages the sealing surface of the sealing ring.

A circular wave spring, which is anchored to the housing and is disposed between the composite sealing ring and a snap ring secured to the housing, provides an axial force which forces the two sealing surfaces into sealing contact. The waves of the spring act as individual hydrodynamic bearings, and the axial force is transmitted across an oil film. This eliminates rubbing contact and the need for a separate thrust bearing.

7 Claims, 4 Drawing Figures

U.S. Patent  April 27, 1976  Sheet 1 of 2  3,953,038

FLUID SEAL FOR ROTATING SHAFTS

FIELD OF THE INVENTION

The present invention relates to liquid-gas (oil-air) seals for rotating shafts.

ORIGIN OF THE INVENTION
BACKGROUND OF THE INVENTION

A number of different types of shaft seals are used in providing a seal between the liquid and gas sides of a rotating shaft. These seal types include lip seals, circumferential seals, self-contained (cartridge type) face seals and ring seals. All of these seal types have disadvantages in use. For example, lip seals have shaft speed limitations as well as pressure limitations. Circumferential seals and ring seals both suffer leakage problems particularly under so-called "flooded" conditions. Existing self-contained face seals present assembly difficulties including, for example, the requirements regarding "picking up" of tightly fitting O-rings. Further, some of the seals of this type are speed limited because the centrifugal forces generated during shaft rotation tend to seriously reduce the effectiveness of the torque resistance mechanism of the seal. Further, conventional face seals occupy excessive space and some seals of this type have leakage problems resulting from the collection of sealed liquid at the inside diameter of the sealing face.

Representative shaft seals which are of a general interest insofar as the present invention is concerned include those disclosed in U.S. Pat. Nos. 2,586,739 (Summers); 2,871,040 (Payne); 3,689,083 (Greenwalt); 3,319,968 (Yost) and 3,239,232 (Anderson) although this listing is not, nor is it intended to be, exhaustive.

SUMMARY OF THE INVENTION

In accordance with the invention, a fluid seal for a rotating shaft is provided which overcomes or substantially reduces the problems associated with prior art seals such as discussed above.

According to a preferred embodiment thereof, the fluid seal of the invention comprises an outer stationary annular member which is adapted to be secured to the fixed portion of the rotating shaft assembly and which includes an inwardly projecting portion defining a radially extending sealing surface; an inner rotating annular member which rotates with the rotating shaft; an annular sealing ring, disposed between the stationary and rotating members, which is keyed to the rotating member and which includes a radial extending annular sealing surface that sealingly engages the sealing surface of the stationary member; and an annular spring means, in the form of a wave spring, which is disposed between the stationary and rotating members in engagement with the sealing ring and which provides an axial force against said sealing ring so as to maintain sealing contact between the bearing and as a spring loading member. A flat annular snap ring secured to the stationary member and disposed between the stationary and rotating members serves in anchoring the wave spring in place.

The sealing ring comprises a composite ring including an annular ring portion which is preferably made of a carbon material and which defines the sealing surface referred to above, and a keying member which comprises an annular spring which is secured to the ring portion and which has high torsional stiffness and low axial stiffness. Keying of the spring portion of the sealing ring to the rotating member is provided by tabs or fingers which are located about the periphery of the spring and which engage in corresponding slots in the stationary member.

The placement and annular design of the various components enable rapid installation of the seal, the various components constituting a "plug-in" type assembly similar to that of a lip seal. The wave spring is sized to permit a low axial force installation such as by "tapping in" with a hammer, yet the torsional drive force provided is sufficient to resist the torque exerted by the face seal between the two sealing surfaces referred to above.

Other features and advantages of the invention will be set forth or apparent from the detailed description of a preferred embodiment found hereinbelow.

DESCRIPTION OF THE PREFERRED EMBODIMENTS

Figure 1:
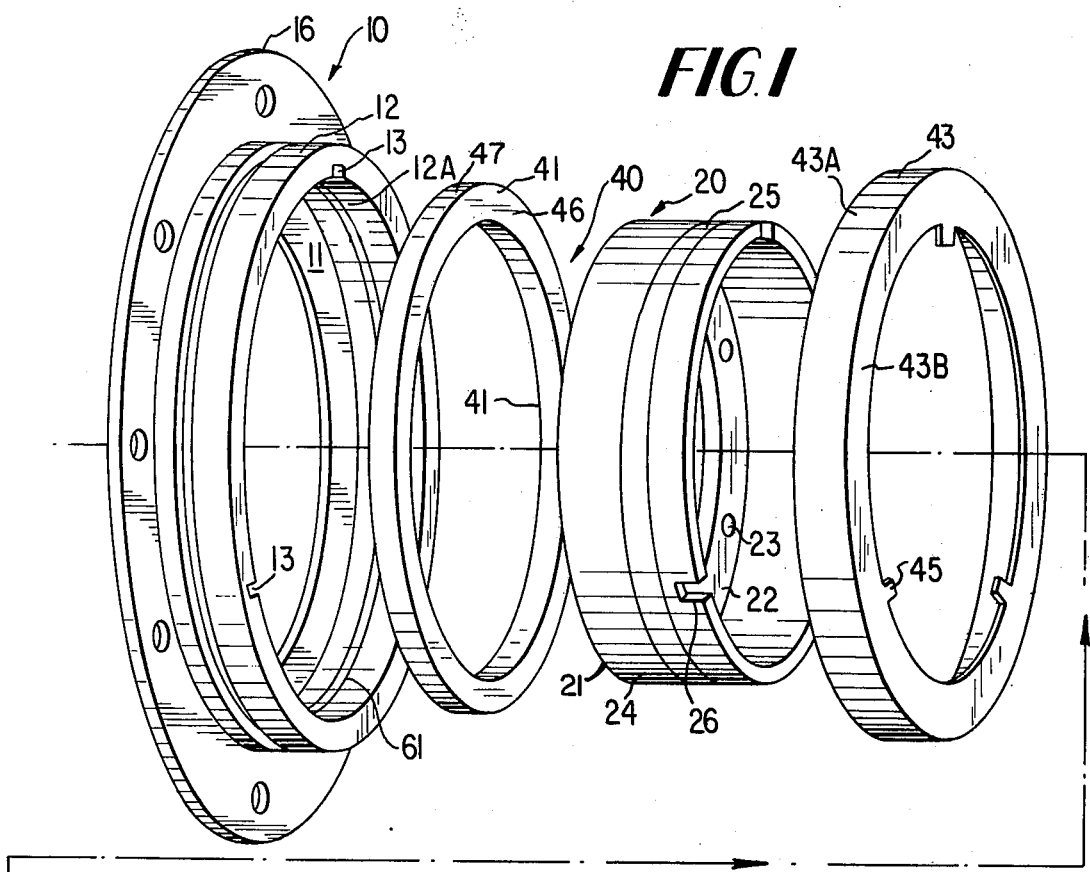
FIG. 1 is an exploded perspective view of a liquid-gas seal in accordance with a preferred embodiment of the invention.
Figure 2:
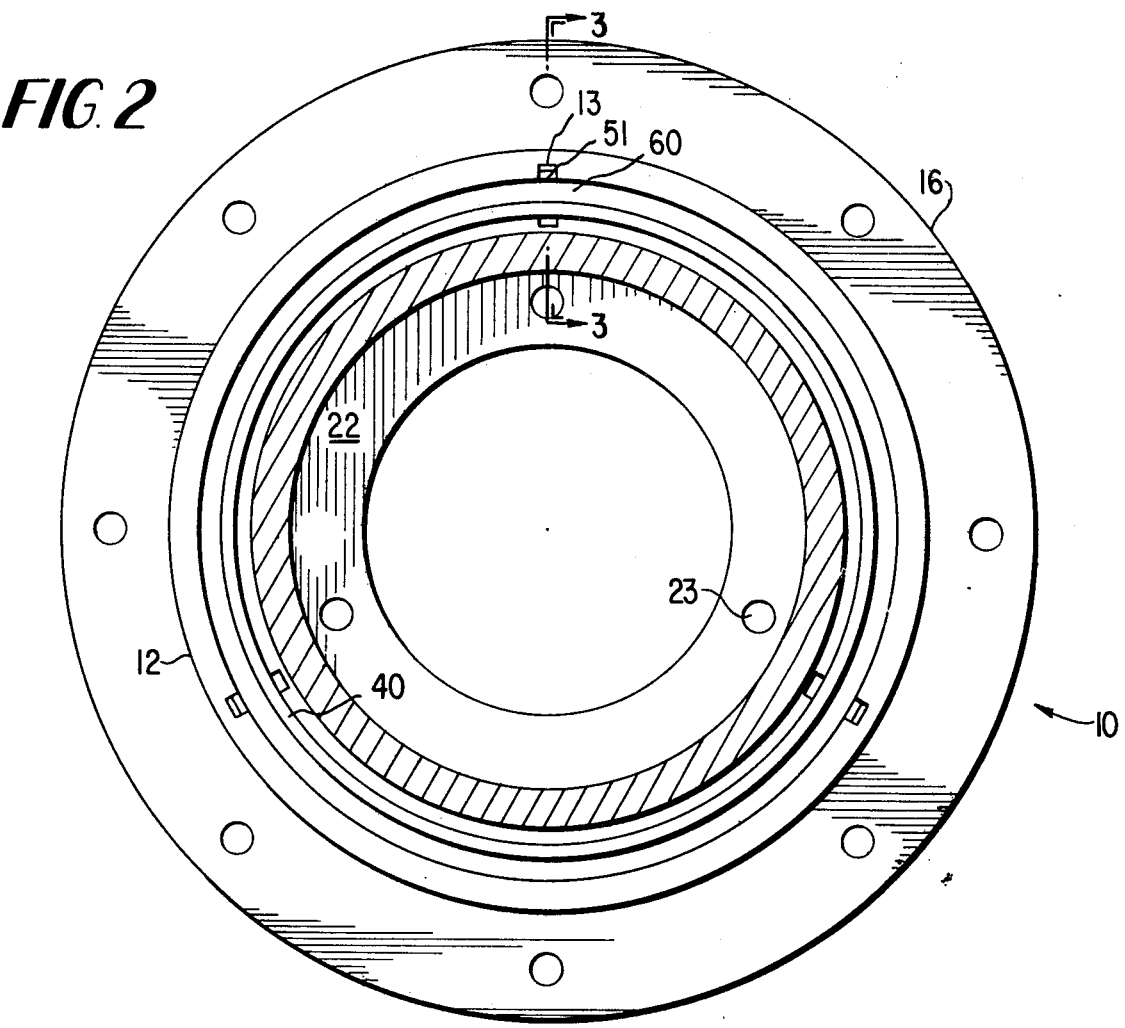
FIG. 2 is an end elevation of the seal of FIG. 1.
Figure 3:
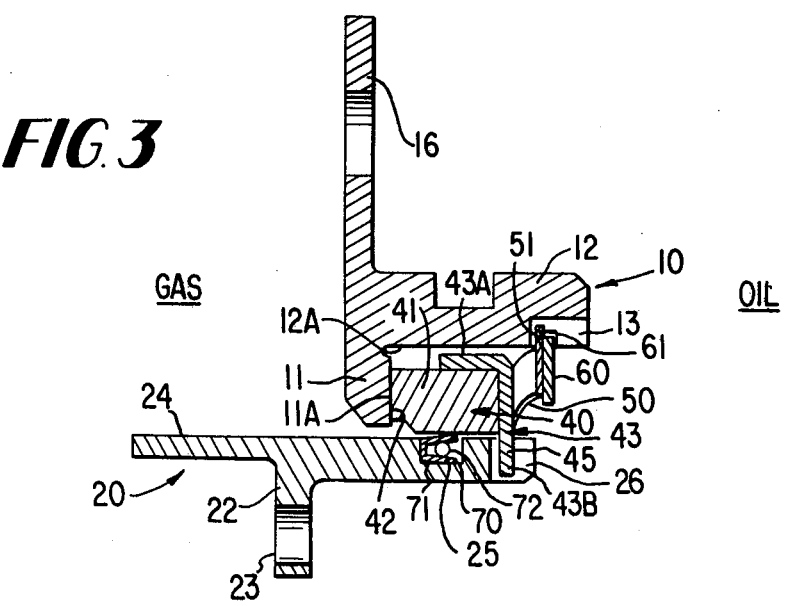
FIG. 3 is a transverse section taken generally along line 3—3 of FIG. 2.

Referring particularly to FIGS. 1 to 3, a rotating seal in accordance with a preferred embodiment of the invention includes a housing 10 comprising an annular ring which is generally T-shaped in transverse cross section. The housing 10 is adapted to be secured to a supporting structure (not shown) by a circumferential flange 16 which extends radially outwardly from housing 10 as shown, the flange 16, in cross section, forming one arm of the T cross-section ring. The housing 10 also includes a radially inwardly projecting lip 11 which forms the other arm of the T cross-section ring. The inwardly projecting lip 11 has a flat radial sealing surface 11a located on the oil side thereof. The housing 10 further includes an axial extending body portion 12, which forms the trunk or base of the T cross-section ring. The housing 10 has three radial slots 13 (See FIG. 3) which are equally spaced around the perimeter of the free end of axially extending body portion 12 and which serve a function described below. The housing 10 is preferably fabricated of stainless steel although housing 10 can be made of any other material suited to the particular chemical environment in which the rotating seal is to be used.

The rotating seal of the invention also includes a runner 20 which is secured to and rotates with the shaft. The runner 20, which can be best seen in FIGS. 1 and 3, comprises an annular body portion 21 which includes a radially inwardly extending shaft flange 22 having a series of holes 23 therein which enable runner 20 to be bolted to the rotating shaft. (The rotating shaft is not shown in FIGS. 2 and 3 and is indicated at S in FIG. 1). The outer circumferential surface 24 of runner 20 includes a circumferential groove or notch 25 located therein. An annular sealing device 70, which is described in more detail hereinbelow, is received in groove 25. As shown in FIG. 1, three radial slots 26 are equally spaced about the periphery of the oil side end of runner 20, slots 26 performing a function which is described below.

The sealing device 70 referred to above comprises, in the preferred embodiment under consideration, an annular spring 71 of generally U-shaped cross section and an O-ring 72 which is disposed within the crotch of the U-shaped annular spring 71. Sealing device 70 forms a fluid tight seal between the runner 20 and a composite sealing ring 40 described below. It should be understood that other sealing devices, such as a simple O-ring, can also be used.

Figure 4:
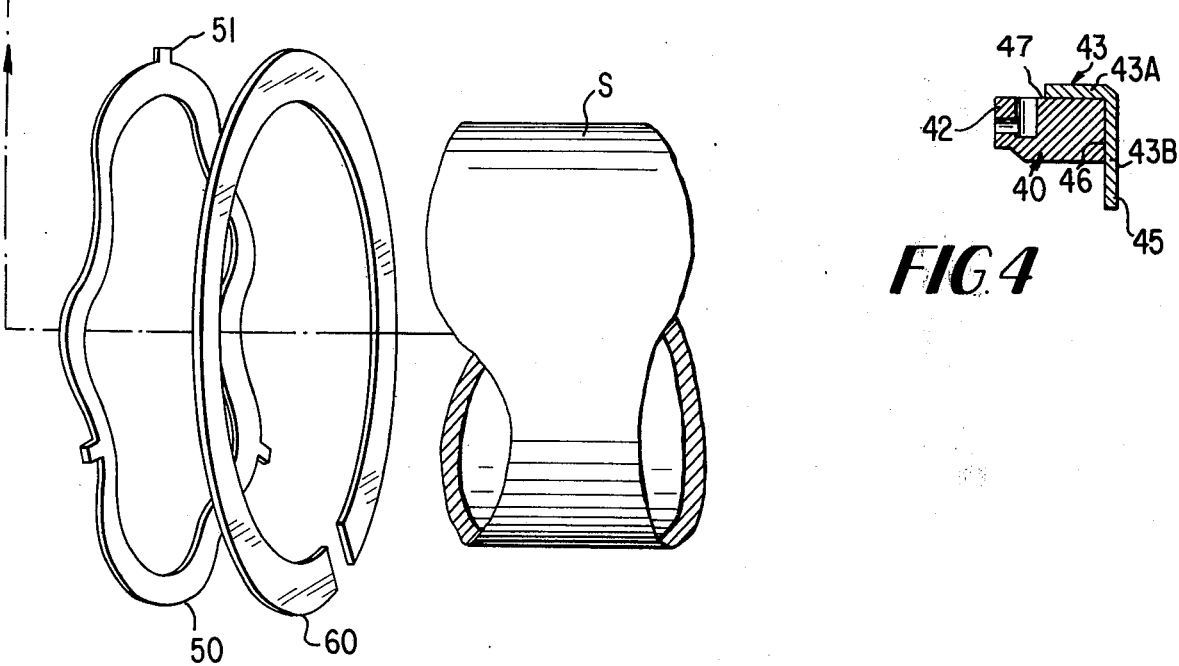
FIG. 4 is a transverse section illustrating an alternate embodiment of the sealing ring of FIGS. 1 to 3.

As is best seen in FIG. 3, the composite sealing ring 40 mentioned above is disposed between the outer circumferential surfae 24 of runner 20 and the inner circumferential surface 12a of the body portion 12 of housing 10, coaxial with runner 20 and housing 10. The composite sealing ring 40 comprises an annular ring 41 of substantially rectangular cross section and including a radially extending sealing surface 42 on the gas side thereof. The sealing surface 42 of the composite sealing ring 40 forms a fluid tight seal with the radial sealing surface 11a of the lip portion 11 of housing 10. Annular ring 41 is preferably made of a carbonaceous material and, in a preferred embodiment, takes the form shown in FIG. 4.

The composite sealing ring 40 also includes a key ring 43 which is rigidly affixed to ring 41 and secured to runner 20 so that the composite sealing ring 40 rotates with the shaft S. Although ring 41 and key ring 43 are shown as separate elements in the exploded perspective view of FIG. 1, it is to be understood that the two elements are bonded together to form an integral ring member and hence that composite sealing ring 40 should be considered to be a single, integral element for purposes of this description. The key ring 43 is, as shown in FIG. 3, of L-shaped cross section including an axially extending leg 43a and a radially extending leg 43b. As illustrated, the inner surface of leg 43a is bonded to the outer surface 47 of ring 41 while the air side surface of leg 43b is bonded to the rear or oil side surface of ring 41. The outer radius of key ring 43 is such that composite ring 40 rotates freely with respect to the inner surface of the axially extending body portion 12. Key ring 43 also includes three radially inwardly extending tabs 45 which are adapted to engage in the corresponding slots 26 in runner 20, as shown in FIG. 3, so that composite sealing ring 40 rotates with runner 20 and hence with shaft S.

The sealing arrangement of the invention also includes a wave spring 50 and a snap ring 60. The wave spring 50 is interposed between the composite sealing ring 40 and the snap ring 60 as can best be seen in FIG. 3. As shown in FIG. 1, wave spring 50 is an annular ring having circumferential undulations therein and is preferably constructed of a spring tempered metal such as a beryllium copper alloy. The wave spring 50 is sized so as to nest concentrically between the inner surface of the body portion 12 of housing 10 and the outer circumferential surface 24 of runner 20. The wave spring 50 has three anti-rotational tabs 51 on the outer circumference thereof which fit into the radial slots 13 of housing 10 to prevent the spring 50 from rotating. The wave spring 50 serves two important functions. First the spring 50 acts as a thrust bearing in absorbing any axial thrust of the composite sealing ring 40 during rotation. Second, spring 50 also acts as a spring loading member, in that it serves to apply axial pressure against the composite sealing ring 40 so as to force sealing ring sealing surface 42 into sealing contact with the sealing surface 11a of housing 10.

Snap ring 60 serves primarily to secure wave spring 50 in place. Snap ring 60 is the flat annular ring having an outer radius slightly larger than that of wave spring 50. Snap ring 60 is received in a circumferential slot 61 which extends about the inner surface of the body portion 12 as shown in FIGS. 1 and 3. Snap ring 60 provides a firm axial backing for wave spring 50 and directs the axial force produced by wave spring 50 towards the composite sealing ring 40.

As previously mentioned, a major advantage of the rotating seal of the invention is that, because of the concentric nesting of the components thereof, a "plug-in" type assembly is provided which enables a relatively simple end-on assembling of the seal. This eliminates assembly errors which can damage the primary sealing face 11a. Also a predetermined spring loading on the composite sealing ring is achieved.

It will be understood by those skilled in the art that although the invention has been described with reference to an exemplary embodiment thereof, variations and modifications can be effected in this exemplary embodiment without departing from the scope and spirit of the invention.

I claim:

1. A liquid-gas seal for a rotating shaft comprising an outer annular stationary member including an inwardly projecting portion defining radial extending annular sealing surface; an inner annular rotating member which rotates with the rotating shaft; an annular sealing ring disposed between said stationary member and said rotating member and including key means for keying said sealing ring to said rotating member, said sealing ring further including a radial extending annular sealing surface which sealingly engages the sealing surface of said stationary member; and substantially stationary annular spring means, disposed between said stationary member and said rotating member in engagement with said sealing ring, for providing an axial force against said sealing ring so as to maintain sealing contact between said sealing surface of said stationary member and the sealing surface of said sealing ring.

2. A liquid-gas seal as claimed in claim 1 wherein said spring means comprises a circular wave spring.

3. A liquid-gas seal as claimed in claim 2 further comprising an annular snap ring disposed between said stationary member and said rotating member in engagement with the axial surface of said wave spring opposite to that in engagement with said sealing ring, and means for detachably securing said snap ring to said stationary housing.

4. A liquid-gas seal as claimed in claim 1 wherein said sealing ring comprises a composite ring including a ring portion made of a carbonaceous material.

5. A liquid-gas seal as claimed in claim 1 wherein said sealing ring comprises a composite ring having a key ring annular in shape and including at least two key tabs spaced about the inner peripheral edge thereof which are adapted to engage in corresponding slots in said rotating member.

6. A liquid-gas seal as claimed in claim 2 wherein said wave spring includes a plurality of spaced peripheral tabs adapted to engage in corresponding slots in said stationary member.

7. A liquid-gas seal as claimed in claim 1 wherein said spring means comprises a circular wave spring and said annular sealing ring includes a carbon ring and a key ring including a plurality of spaced, peripheral key tabs for keying said sealing ring to said rotating member.

* * * * *